Feb. 23, 1965  H. L. DEITTRICK ETAL  3,170,242
MICROMETER TOOL SETTING GAGE
Filed Aug. 20, 1962
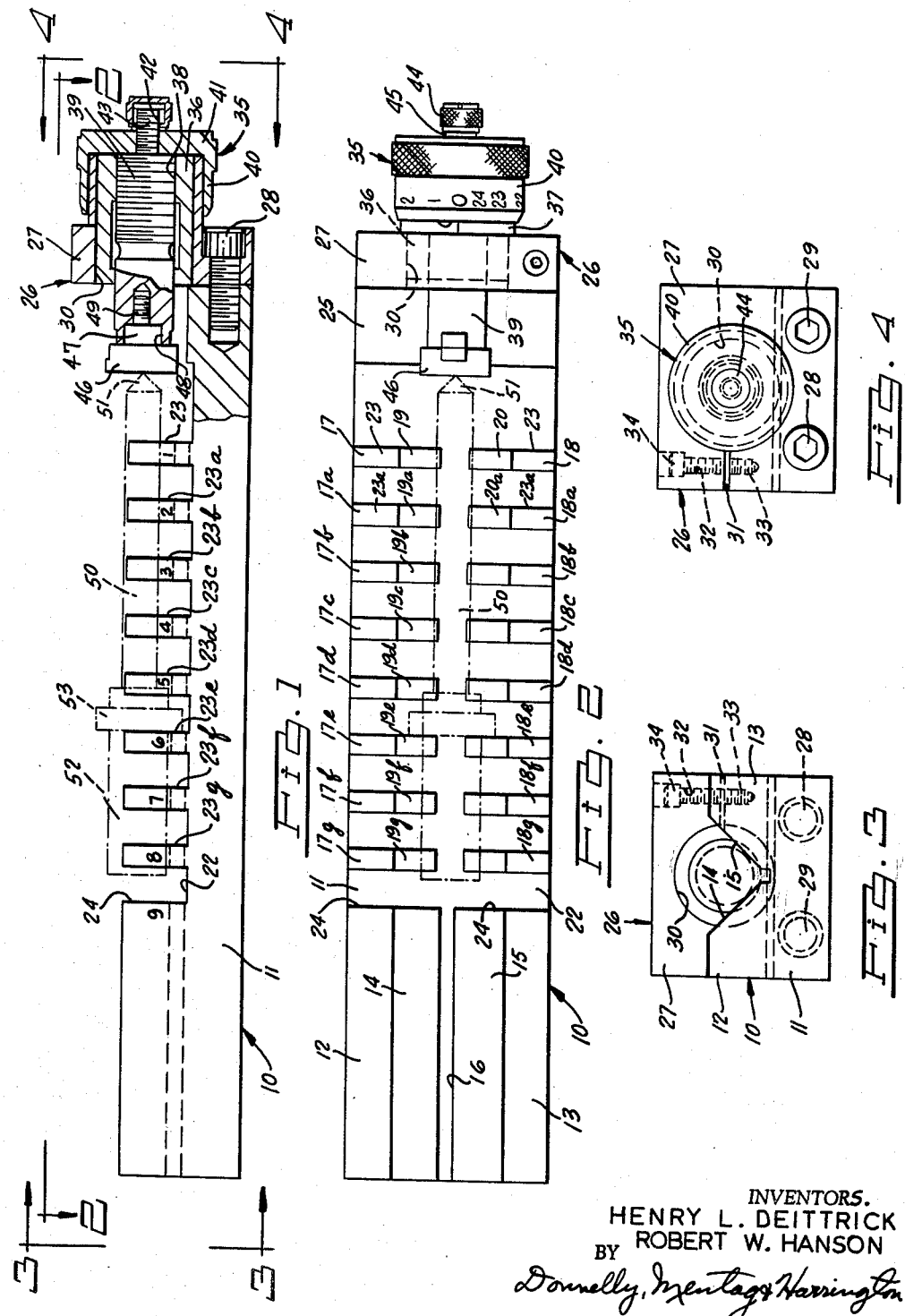
INVENTORS.
HENRY L. DEITTRICK
BY ROBERT W. HANSON
ATTORNEYS 3,170,242
MICROMETER TOOL SETTING GAGE
Henry L. Deittrick, Fraser, and Robert W. Hanson, Utica, Mich., assignors to Michigan Special Machine Co., Warren, Mich., a corporation of Michigan
Filed Aug. 20, 1962, Ser. No. 218,062
1 Claim. (Cl. 33—165)

This invention relates generally to tool setting gages, and more particularly, to a setting gage tool which is adapted to precisely set the cutting depth of tools such as spotfacers, counterbores, end mills or the like.

In the machine tool industry, many cutting tools are used which are provided with adjustable adapters for setting the cutting depth of the tool. Heretofore it has been the practice to set the adjustable adapter of the cutting tool to the desired position by means of a multitude of set up gages. Accordingly, it is the primary object of the present invention to provide a novel and improved tool setting gage which provides a simple and compact means of setting cutting tools mounted in adjustable adapters where high accuracy is required.

It is another object of the present invention to provide a tool setting gage for setting cutting tools mounted in adjustable adapters and which comprises a hardened and precision ground V-groove bore into which the adjustable adapter of a tool is disposed and which bore is provided with gaging notches ground across its width or transverse dimension. The distance from the gage face of one inch on the bore to the gage face of the adjacent notch is exactly 1.000 inch. The adjustable adapters are provided with adjustable nuts and by putting the back face of the adjustable nut of the adapter against the gage face of any of the notches, it will be seen that cutting tool lengths may be read in increments of one inch. The cutting end of the cutting tool is adapted to bear against the ground end face of a micrometer screw means which is adjustable through one inch, in increments of .001 inch. The micrometer screw is adapted to be locked into position by the knurled nut. The V-groove bar is provided with a plurality of setting gage notches to provide the gage with a setting range quickly to whatever number of notches are used times one inch for each notch.

It is a further object of the present invention to provide a cutting tool setting gage which is adapted to provide a wide range of setting length and which is capable of precision adjustment so as to provide a versatile and efficient tool for a set-up man.

Other objects, features and advantages of this invention will be apparent from the following detailed description and appended claim, reference being had to the accompanying drawing forming a part of the specification wherein like reference numerals designate corresponding parts of the several views.

In the drawing:

FIG. 1 is a side elevation view of a cutting tool setting gage, partially in cross section, and made in accordance with the principle of the present invention;

FIG. 2 is a top plan view of the structure illustrated in FIG. 1, taken along the line 2—2 thereof and looking in the direction of the arrows;

FIG. 3 is a left end elevation view of the structure illustrated in FIG. 1 taken along the line 3—3 thereof and looking in the direction of the arrows; and FIG. 4 is a right end elevation view of the structure illustrated in FIG. 1 taken along the line 4—4 thereof and looking in the direction of the arrows.

Referring now to the drawings, and in particular to FIGS. 1 and 2, the reference numeral 10 generally indicates the elongated V-bar or block of the tool setting gage of the present invention. The V-block 10 includes the elongated rectangularly shaped base portion 11 which is provided on the left end thereof, as viewed in FIGS. 1 and 2, with a pair of integral longitudinally extended blocks 12 and 13. The blocks 12 and 13 extend upwardly from the base portion 11 and extend to the right along the base portion for approximately one third the distance thereof. As shown in FIGS. 2 and 3, the blocks 12 and 13 are each provided with an inwardly and downwardly extended tapered surface as 14 and 15 along the inner corners thereof, and these tapered surfaces extend longitudinally of the blocks. The tapered surfaces 14 and 15 form a V-groove upon which a tool may be laid. The tapered surfaces 14 and 15 extend downwardly and terminate at the longitudinally extended axial groove 16.

As shown in FIGS. 1 and 2, the V-bar 10 is provided with a plurality of pairs of oppositely disposed tool supporting blocks 17 and 18 which adapted to support a tool. The illustrative embodiment shows that there are eight pairs of the blocks 17 and 18, and the first pair of blocks are marked with the numerals 17 and 18 and the other similar blocks are marked with corresponding numerals followed by the small letters "a" through "g." The tool supporting blocks 17 and 18 are provided with the inwardly and downwardly extended tapered surfaces 19 and 20 on the inner corners thereof so as to provide a V-groove for supporting a tool. The tapered surfaces 19 and 20 terminate at the inner end thereof at the axially extended slot 21. The slot 21 extends for the length of the V-block to the left as viewed in FIG. 2 so that each of the pairs of blocks 17 and 18 have their inner edges in alignment along the slot 21. The top of the base portion of the V-bar 10 is indicated by the numeral 22. The front and rear faces of the blocks 17 and 18 are vertically formed. As shown in FIGS. 1 and 2, the pairs of tool supporting blocks 17 and 18 are longitudinally, laterally spaced apart equal distances of exactly one inch. That is, the front vertical surfaces 23 of the blocks 17 and 18 are precision formed so as to be exactly one inch away from the vertical faces 23a on the set of blocks 17a and 18a immediately to the rear of the blocks 17 and 18. The front vertical surfaces of the other pairs of blocks are equally spaced apart one inch. The vertical front faces 24 of the rear blocks 12 and 13 are also precision finished and are one inch spaced apart from the vertical faces of the blocks 17g and 18g. The front end of the base portion 11 is slightly raised above the other top portion 22 of the base portion 11 as indicated by the numeral 25.

As shown in FIGS. 1 through 4, a micrometer screw mounting means is generally indicated by the numeral 26, and is mounted on the right end of the V-block 10 as viewed in these figures. The micrometer screw mounting means comprises the vertical block 27 which is fixedly connected to the right end of the base portion 11 by means of the screws 28 and 29. As shown in FIG. 3, the block 27 extends upwardly from the lower end of the base portion 11 to a point substantially above the tool supporting blocks 17 and 18.

As shown in FIGS. 1 and 3, the vertical block 27 is provided with the axial bore 30 which extends completely therethrough. The block 27 is further provided with the horizontal slot 31 which extends through one side of the block from the bore 30 to the outer surface of the block. A bolt 34 is disposed in the vertical bore 32 in the upper portion of the block 27 above the slot 31 and the lower end of the bolt 34 is threadably mounted in an aligned bore 33. It will be seen that by threading the bolt 34 inwardly, the upper end of the block 27 above the slot 31 will be sprung or moved downwardly so as to clamp the member in the bore 30.

As shown in FIGS. 1, 2 and 4, the numeral 35 generally indicates a micrometer screw means which includes the tubular body 36. The tubular body 36 has the inner end thereof clamped in the bore 30 in the block 27 with the outer end thereof extending rearwardly or to the right as shown in FIG. 1 beyond the outer surface of the block 27. As shown in FIGS. 1 and 2, a sleeve bearing 37 is mounted on the outer extended end of the tubular body 36. The tubular body 36 is provided with the axially extended threaded bore 38 in which is threadably mounted the micrometer screw 39. The micrometer screw 39 is a conventional micrometer screw and has the inner end thereof extended inwardly beyond the inner side of the block 27 and with the outer end thereof extended outwardly to the right as shown in FIG. 1. A sleeve 40 is rotatably mounted on the sleeve bearing 36 and is provided on the outer periphery with a graduated dial of the usual micrometer markings. The outer periphery of the sleeve 40 is also provided with a knurled portion. The sleeve 40 is provided with the vertical integral plate 41 on the outer end thereof so as to enclose the outer end. A small axial bore 42 is formed through the plate 41 and extended through the hole 42 is the stub shaft 43 which is formed integral with the micrometer screw 39 on the outer end thereof. It will be seen that the outer end of the micrometer screw 39 is precision finished and is vertically formed, and that the inner vertical surface of the wall 41 is adapted to abut against the outer vertical end of the screw 39. The micrometer adjusting graduated sleeve 40 is fixed to the screw 39 by means of the knurled nut 44 which is threaded on the outer end of the shaft 43. A suitable washer 45 is disposed between the wall 41 and the nut 44. The wall 41 is slidably mounted over the stub shaft 43.

As shown in FIGS. 1 and 2, a round tool abutment head 46 is fixedly mounted on the left or inner end of the micrometer screw 39. The abutment head 46 is provided with the reduced integral shoulder 47 on the right side thereof as viewed in FIG. 1. A recess 48 is formed in the inner end of the micrometer screw 39 for the slidable reception of the reduced shoulder 47. Integrally formed on the outer side of the shoulder 47 is the axial threaded stub shaft 49 which is adapted to be threaded in a suitable bore formed in the inner end of the micrometer shaft 39. An illustrative tool 50 as a drill is shown as disposed in the tool setting gage of the present invention. The tool point is indicated by the numeral 51 and it is disposed so as to abut the round abutment head 46. The tool is provided with the shank or tool holder 52 on which is adjustably mounted, as by threading thereon, the adjusting nut 53. The aforedescribed tool is merely illustrative of the tools that may be set with the gage of the present invention. The tool may be a spotfacer, counterbore, an end mill or the like.

In the use of the gage of the present invention the tool is disposed on the centerline of the V-bar in the continuous V formed by the tapered surfaces of the various blocks formed on the V-bar. By placing the back face of the adjustable nut 53 against the front gage face 23 of any one of the blocks 17 and 18, readings in increments of one inch can be taken from that point forwardly to the front face 23 of the front blocks 17 and 18. The micrometer would be set to zero as shown in FIG. 2 and then the distance between the face of the abutment 46 and the surfaces 23 of the front blocks 17 and 18 is also exactly one inch. The tool 50 would then be adjusted relative to the nut 53 by adjusting the micrometer inwardly or outwardly any desired distance as shown by the graduated dial 40, in the usual manner of using the micrometer.

In one illustrative size the tool setting gage of the present invention had an overall length of 18 inches, an overall height of 3 inches and a transverse dimension of 3½ inches. Its range of setting lengths extended up to 10 inches and the same range is illustrated in the illustrative embodiment. The blocks 18 are marked with the numbers 1 through 8 and the front face of the block 13 is marked by the numeral 9. The gage is thus provided with a setting range of up to 10 inches. It will be understood that the V-bar 10 is made from a hardened and precision ground V-groove structure. The tool may be made in any desired size. In the illustrative tool which was made in the aforecited dimension, the V-groove was made to accommodate a tool having a ⅝ of an inch diameter to a 1⅞ diameter adapter size. Experience has shown that the setting gage of the present invention is an economical and precise instrument which provides a versatile tool for a set-up man, and which eliminates a multitude of set-up gages.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claim.

What we claim is:

A tool setting gage comprising: an elongated rectangularly shaped base portion; a pair of integral blocks formed on one end of said base portion and extended upwardly therefrom and longitudinally thereof; each of said blocks being spaced apart by a longitudinally extended central axial groove; each of said blocks being provided with a downwardly and inwardly sloping longitudinally extended surface on the inner sides thereof adjacent said axial groove; a vertically extended mounting block fixed to the other end of said base portion; a horizontal bore formed in said mounting block and in alignment with said longitudinal axial groove; a micrometer means detachably clamped in said horizontal bore in said mounting block; a tool abutment member operatively mounted on the inner end of said micrometer means and disposed in longitudinal alignment with said axial groove; a plurality of integral blocks formed on each side of the base portion, the blocks on one side of said base portion being spaced transversely apart from each other; each of said last mentioned blocks having a downwardly and inwardly sloping surface formed on the inner side thereof; the inwardly sloping surfaces of said last mentioned blocks being disposed in the same plane and in alignment with the inwardly sloping surfaces on said first mentioned blocks on said one end of the base portion; the last mentioned blocks on each side of said base portion being transversely aligned in pairs and each pair being longitudinally spaced apart predetermined equal distances; said last mentioned blocks being adapted to function as gage blocks set at predetermined distances from the abutment member on said micrometer means and being operative to engage tool adaptors to permit the insertion and setting of elongated cutting tools in the adaptors.

References Cited by the Examiner

UNITED STATES PATENTS

| 1,142,436 | 6/15 | Joha | 33—164 |
| 1,379,878 | 5/21 | Rouanet | 33—165 |
| 2,444,136 | 6/48 | Leasure | 33—167 X |
| 2,465,791 | 3/49 | Daoust | 33—143 |
| 2,835,040 | 5/58 | D'Elia | 33—167 |

FOREIGN PATENTS 349,357  5/31  Great Britain.

ISAAC LISANN, *Primary Examiner.*